UNITED STATES PATENT OFFICE.

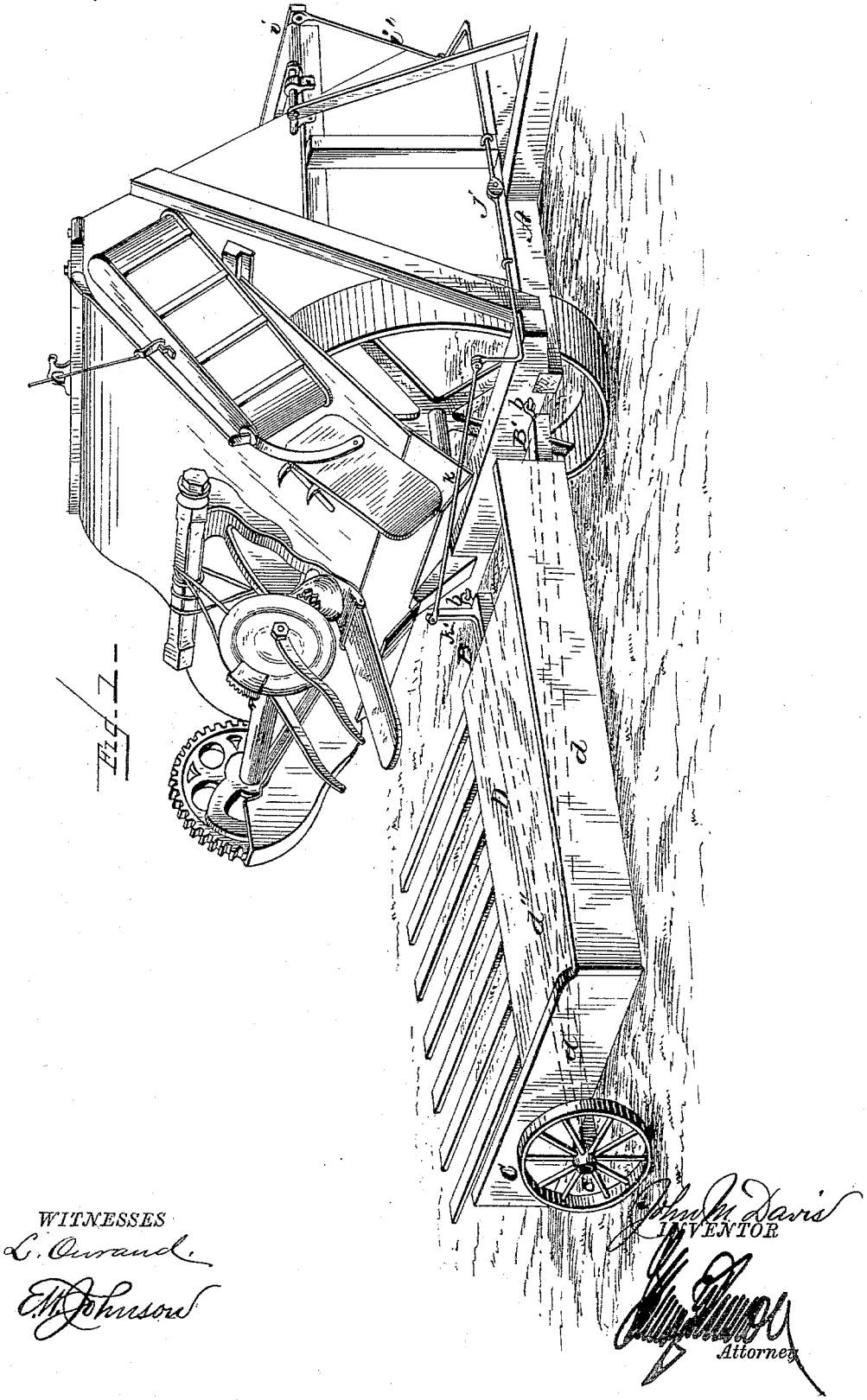

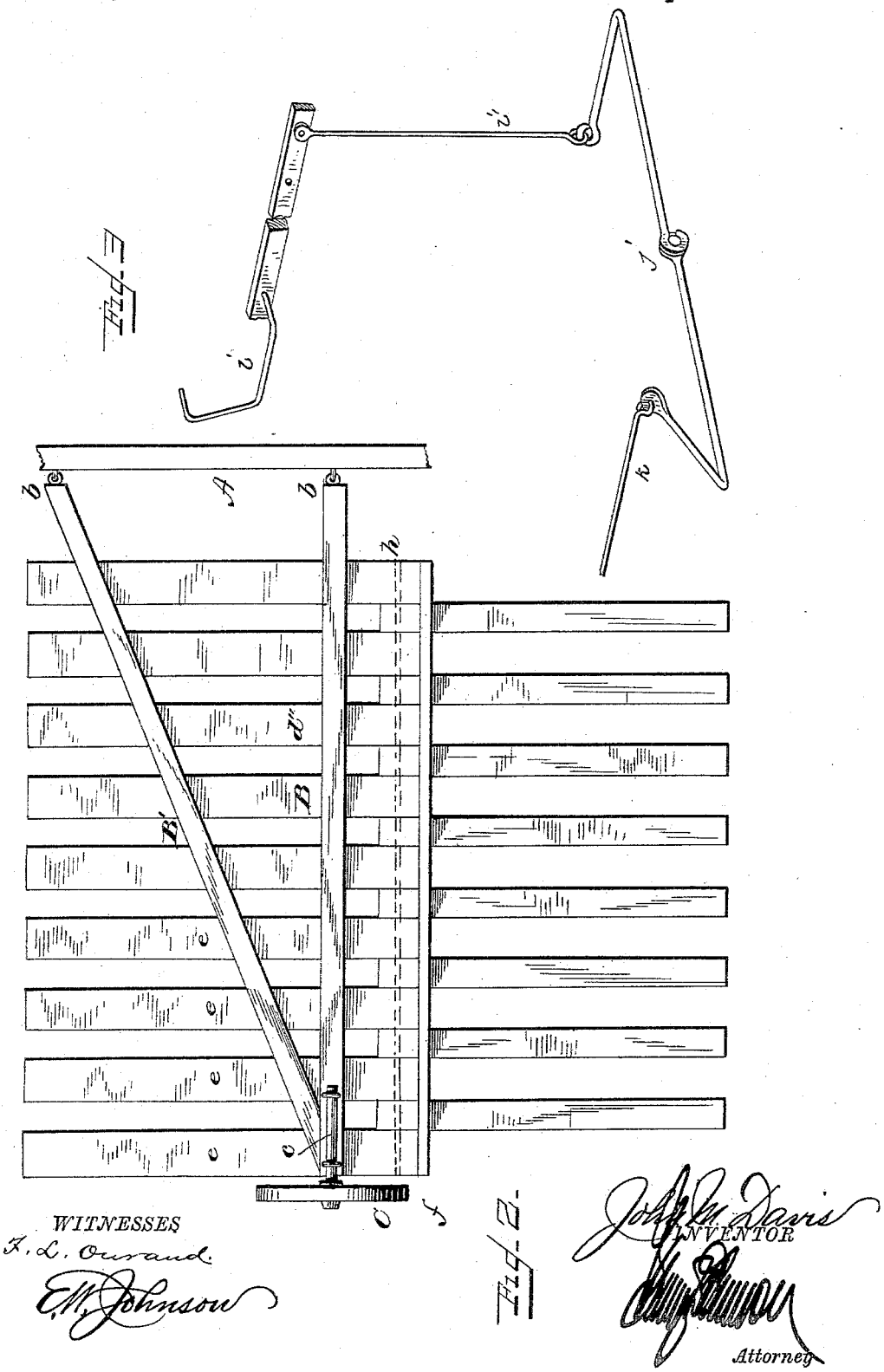

JOHN M. DAVIS, OF STAUNTON, ILLINOIS.

SHEAF-DUMPER FOR HARVESTERS.

SPECIFICATION forming part of Letters Patent No. 339,385, dated April 6, 1886.

Application filed November 26, 1884. Serial No. 148,919. (No model.)

*To all whom it may concern:*

Be it known that I, JOHN M. DAVIS, a citizen of the United States of America, residing at Staunton, in the county of Macoupin and State of Illinois, have invented certain new and useful Improvements in Sheaf-Dumpers for Harvesters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to sheaf-dumpers for harvesters; and it consists in the improvements hereinafter described and set forth.

In the accompanying drawings, which illustrate my invention, Figure 1 is a perspective view showing the same applied to a self-binding harvester. Fig. 2 is an inverted plan view of the carrier and dumper, and Fig. 3 is a detail view.

A represents the frame of a self-binding harvester, which may be of any approved pattern. To one of the side beams of said harvester is loosely hinged or pivoted the ends of the supporting-beams B B', upon which beams are mounted the sheaf carrier and dumper. The beam B extends at right angles from the beam of the harvester, to which it is pivoted, and at its outer end it is provided with a supporting-wheel, C, a stub-axle, c, being secured to the under side of this beam B. The beam B is attached at its outer end rigidly to the end of the beam B', and diverges therefrom, as shown in Fig. 2.

The hinges or connections which attach the ends of the beams B B' to the frame of the harvester are indicated by the letters b b.

The sheaf-carrying platform D is provided at its forward end with a vertical board, d, and also with a raised side board, d', and a floor, d'', which extends a slight distance to the rear of the supporting-beam B. Under the floor d'' are a series of slats, e e, to the front end of which is secured a transverse strip, f. Between each of these slats e e, at the rear of the bar f, are pivoted projecting bars or fingers g, which are secured between the slats e e by a rod, h, so that the same can have an upward play.

The platform or sheaf-carrier is pivoted to the beam B so that the major portion of the carrier will project in front of said beam, and the front portion will rest upon the beam B', and when the same is loaded or empty it is not liable to be tilted accidentally.

By the construction hereinbefore described it will be seen that the sheaf-carrying platform may rise and fall with the inequalities of the ground without communicating such motion to the harvester and binder frame; also that the fingers g may rise and fall independent of each other.

The platform D is tilted, when desired, so as to drop the sheaves by the driver of the harvester, who depresses a foot-lever located near his seat. Said foot-lever is indicated by the letter i, and has connected thereto a rod, i', which is attached to the double-crank bar j, pivoted to the frame A. A rod, k, connects the double-crank bar or shaft with a crank-arm, k', which is pivoted to and projects upwardly from a beam, B, the opposite end of the crank-arm k' being rigidly attached to the platform D.

The operation of my invention is as follows: The grain is cut and bound into sheaves by the self-binding harvester in the usual manner, and the sheaves are deposited upon the carrier D at its forward end. When a sufficient number of sheaves have been deposited upon this carrier to form a shock or stack, the foot-lever is depressed to effect the ascent of the rod i', which turns the jointed rod j', moves the bent forward end of the same, and moves the crank-lever k' from a vertical to an inclined position, which causes the platform to be tilted, thus depositing the sheaves upon the ground. As soon as the pressure is taken off the foot-lever, the platform will automatically resume its normal position.

I claim—

In combination with a self-binding harvester, the beams B B', loosely pivoted to the harvester-frame and provided at their outer ends with a supporting-wheel, a platform pivoted to the beam B so that its major portion will project in front of the same, crank-arm k', connecting-bar k, double-crank shaft j, and an operating-lever connected to said shaft j, substantially as set forth.

In testimony whereof I affix my signature in presence of two witnesses.

JOHN M. DAVIS.

Witnesses:
S. F. SPALDING,
N. B. WEBER.